May 5, 1959 R. N. ROWE 2,885,652
TERMINAL ASSEMBLY FOR ENCLOSED ELECTRIC APPARATUS
Filed Nov. 18, 1954 2 Sheets-Sheet 1

INVENTOR.
Raymond N. Rowe
BY Martin Kalikow
ATTORNEY

INVENTOR.
Raymond N. Rowe
BY Martin Kalikow
ATTORNEY

United States Patent Office 2,885,652
Patented May 5, 1959

2,885,652

TERMINAL ASSEMBLY FOR ENCLOSED ELECTRIC APPARATUS

Raymond N. Rowe, Plainville, Conn., assignor to General Electric Company, a corporation of New York Application November 18, 1954, Serial No. 469,817

3 Claims. (Cl. 339—198)

My invention relates to electric apparatus, such as motor-control centers or power-distribution centers, where a plurality of electric control or power distributing units are mounted within a general enclosure or cabinet. More particularly, my invention relates to a terminal assembly for enabling electrical connection to and from the electric units mounted within such general enclosures.

In such control or power distribution apparatus it has become common practice to arrange the various electrical units in rows either horizontally or vertically and to provide wiring troughs alongside each row of units. Terminal blocks are ordinarily provided, usually mounted in the wiring trough alongside each unit to which all load and line connections to and from each unit are made after the units have been mounted in their respective compartments within the general enclosure. Because of this arrangement, considerable time and effort is required on the part of the field engineer in installing these electrical centers in order to connect the load, line and other control wires within the trough to these terminal blocks and to interconnect the wires from each electrical unit with its associated terminal block. This procedure ordinarily requires the use of highly skilled field engineers and often requires many detailed wiring instructions and diagrams in order to minimize wiring errors.

Accordingly, an important object of my invention is to provide a terminal assembly for enclosed electrical units which reduces wiring time and errors involved in the field installation of such units within their enclosures.

Another important object of the invention is to provide a terminal assembly for enclosed electrical units which enables a major portion of the wiring connections to and from such units to be made at the factory rather than in the field.

Another object of the invention is to provide a terminal assembly for enclosed electric units which makes possible a plug-in type mounting of the unit within the enclosure.

An additional object of the invention is to provide a simplified, easily formed and easily separable split terminal assembly.

A further object of the invention is to provide a simple and relatively inexpensive split terminal assembly which may be easily built up to accommodate as many terminals as desired.

A further object of the invention is to provide a split terminal assembly in which interconnecting conductive strips are securely positioned within insulating supporting means without positive fastening thereto.

A still further object is to permit interengagement of the connector strips of the split terminal assembly even under slightly misaligned mounting condition of the unit within its enclosure.

In general, in accord with the invention a terminal assembly is provided which is split into two general components or subassemblies one of which is mounted on the electric unit and the other of which is mounted upon an inner wall of the enclosure within which the electric unit is to be located. Each subassembly comprises insulating supporting means having along its length a plurality of sections, and the subassemblies are mounted so that the sections of both subassemblies are in transverse alignment. Metal connector strips are mounted within each section of the insulating supports with the connector strips of aligned sections constructed to make easily separable interconnection. The insulating sections of at least one of the subassemblies preferably has an irregular contour and carry connector strips which are mounted therewithin without positive fastening means by virtue of the correspondingly irregular contour. Individual wire connecting terminals are mounted on each of the connector strips and preferably aid in positioning of the connector strips on their insulating supporting sections. The interconnecting strips are preferably also made flexible and are mounted with a desired looseness of fit in order to permit interengagement even under slightly misaligned conditions.

This split terminal assembly permits prewiring, for example, at the manufacturing location, of the unit wires to the terminal subassembly mounted thereon as well as prewiring within the wiring trough to the terminal subassembly mounted on the inner wall of the enclosure. It is only necessary thereafter during field installation to make the easily separable interconnection between the two subassemblies which, in accord with a further feature of the invention, may be a simple plug-in type interconnection.

The novel features believed characteristic of the invention are set forth in the appended claims. The invention itself, however, together with further objects and advantages thereof may be easily understood by referring to the following description taken in connection with the accompanying drawings in which:

Figure 1:
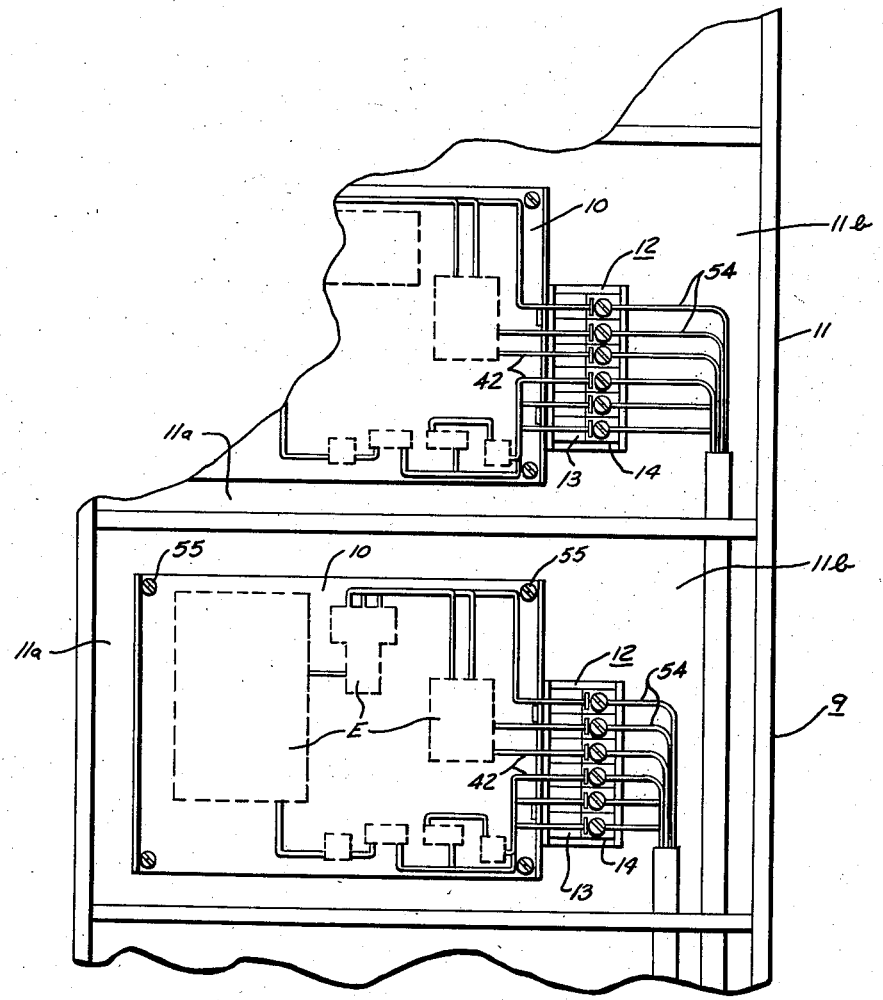
Figure 1 is a plan view with cover removed of a control center illustrating the invention in connection with a control unit, the control elements E of which are shown in schematic form.

Referring to the drawings, one embodiment of the invention is shown in connection with enclosed electrical apparatus 9 comprising motor control units 10 which are mounted within compartments 11a of a larger enclosure or cabinet 11. A terminal assembly 12, in accord with the invention, comprises two subassemblies 13 and 14; subassembly 13 being mounted at one side of unit 10 and subassembly 14 being mounted on an interior wall of cabinet 11 within a wiring trough 11b. Each of the subassemblies includes insulating supporting means 15 and 16, best seen in Figure 2, divided along its length into a plurality of sections or blocks 17 and 18, respectively. Subassemblies 13 and 14 are mounted so that sections 17 and 18 of their respective insulating supporting means 15 and 16 are in transverse alignment.

Insulating support 15 is assembled by longitudinal sliding insertion of its block sections 17 within longitudinal channels 21 formed in the sides of an elongated metallic supporting bracket 19 and fastened by screws 20 to a side wall or mounting bracket 10a of control unit 10. Insulating support 16 is similarly assembled by slidable insertion of its sections 18 within channels 22 in the side walls of a metallic supporting bracket 23 which in turn is fastened by screws 24 to the rear wall of cabinet 11 in the region 11a forming the wiring trough. Each of the insulating block sections 17 and 18 have a pair of legs 25 protruding laterally from its main body portion for slidable insertion within the channels 21 and 22. The side walls of brackets 19 and 23 providing channels 21 and 22 have inturned upper portions or lips 26 which detain the insulated sections 17 and 18 against movement in the direction generally perpendicular to the plane of their respective supporting brackets. In order firmly to position any assembled group of insulating blocks 17 and 18 against slidable movement within their respective supporting channels of the brackets, lips 26 of both brackets 19 and 23 preferably have a plurality of slots 27 formed along their length forming tabs 28 which may be crimped downward as at 28' toward the side walls of the brackets after the insulating sections 17 and 18 are inserted therein. In this way any desired number of inserted block sections may be built up into a group of contiguous blocks and any desired spacing between such groups of built-up blocks can be easily achieved.

Insulating block sections 17 and 18 each carry individual wire connecting terminal means and means for forming easily separable interconnection between transversely aligned sections. In the preferred form of the invention shown in the drawings the easily separable interconnection between aligned sections is a plug-in type connection with a male or stab connector strip 29 supported on each block section 17 and a female or socket connector strip 30 supported by each block section 18. Simple screws 31 and 32 threaded within the non-engaging ends of connector strips 29 and 30 form the terminals for the connecting wires 42.

Figures 2, 3:
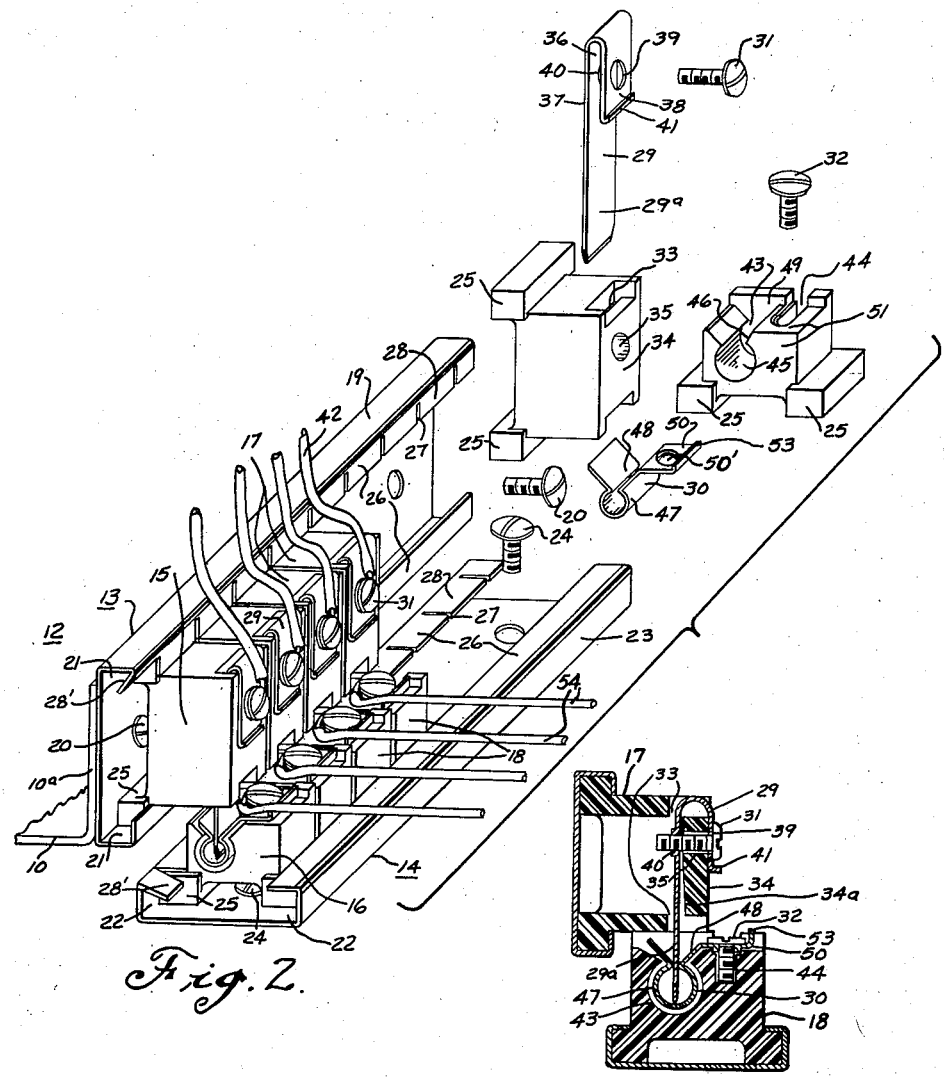
Figure 2 is a perspective view partly exploded of a terminal assembly embodying the invention.
Figure 3 is a cross-section of a pair of interconnecting terminal subassemblies of the invention.

In accord with an important feature of the invention, insulating block sections 17 and 18 are constructed so that male and female connecting strips 29 and 30 may be easily assembled therein and positioned against removal without positive fastening to the blocks by the mere insertion even without tightening, of the terminal screws 31 and 32 respectively. As best seen in Figure 3, insulating block 17 carrying stab connector strip 29 is recessed from the back with registering top and bottom openings to form a vertical slot or passageway 33 extending through the insulating block 17 parallel and adjacent to the vertically extending front wall 34 of the block. A hole 35 of larger diameter than the terminal screw 31 extends through this front wall and communicates with the vertically extending passageway 33. Stab connector strip 29 has a flat slightly flexible lower portion 29a for interengagement with socket connector strip 30 which flat portion extends through and beyond slot 33. The inner lower surface 34a of the front wall 34 is preferably tapered in order to permit flexure of lower stab portion 29a. Stab connector strip 29 also has a return-bent or U-shaped upper portion 36 comprising legs 37 and 38 which fit over and extend on opposite sides of the front wall 34 of insulating block section 17. The downwardly extending legs 37 and 38 have aligned holes 39 and 40 for accommodating terminal screw 31. The rim of hole 40 is tapped such that the entire stab connector 29 is firmly clamped against the front wall 34 when screw 31 is tightened therein. The end of leg 38 preferably has an outstanding projection 41 to aid in the positioning of connecting wire 42 beneath the head of screw 31.

Insulating block section 18 has two cavities 43 and 44 extending inward from the front face of the block 18. Cavity 43 is located within the portion of insulating block 18 adjacent unit 10 and is aligned to receive stab connector strip 29. Cavity 43 has a main cylindrical portion 45 and a reduced neck entrance portion 46 which accommodates the socket connector strip 30 having similarly shaped cross-section; namely, a cylindrical body portion 47 and a closely spaced neck portion 48 forming jaws which clamp against the opposite flat surfaces of stab connector strip 29 when the stab is inserted therebetween. Cavity 43 extends across insulating block section 18 but is closed at one end by a side wall 49 of the block. The cylindrically bent portion 47 of socket strip 30 is slidably inserted within cavity 43 from the open side thereof until it bears against this closing side wall 49.

Socket connector strip 30 also has a flat wire connecting portion 50 which overlies cavity 44 of the insulating block 18. This flat portion 50 has a tapped hole 50' which accommodates terminal screw 32 and an upstanding projection 53 to aid in the positioning of wire 54 beneath terminal 32. Cavity 44 may, for ease in molding, open through one side wall of the insulating block section 18 but is preferably closed by an opposite side wall 51 of this block 18. Terminal screw 32 bears against this side wall 51 when threaded through hole 50' and prevents socket strip connector 30 from moving sidewise out of the open end of cylindrical cavity 43. The reduced neck portion 46 of the insulating block 18 also prevents socket connector strip 30 from forward movement out of engagment with insulating section 18 within which it is inserted. Socket connector strip 30 is thus not fastened to insulating block 18 at any point yet once assembled with terminal screw 32 inserted, remains positioned within the block against removal therefrom. In addition, once the insulating block sections 18 are clamped in contiguous position within the channeled supporting bracket 23, connector strips 30 can no longer be removed even upon removal of terminal screws 32. Moreover, because of no positive fastening means and a desired looseness of fit, socket connector strip 30 can be moved slightly within the accommodating cavities or recesses 43, 44 of insulating block 18 thereby more accurately to align itself and accommodate the stab connector strip 29 even though there be slight misalignment in the position of mounting the subassemblies 13 and 14 respectively. The slightly flexible nature of the stab portion 29 of male connector strip 29 also facilitates this self-alignment. It will also be appreciated that in addition to helping position socket connector strip within the recesses of insulating block section 18, the closed side walls 49 and 51 also serve to provide insulation between socket connector strips of adjacent block sections 18 of the terminal assembly.

It will thus be seen that I have provided a simple split terminal assembly which enables all connections to and from the control unit 10 to be made before the unit is mounted within its enclosing cabinet 11. After all connections have been made, the unit 10 is inserted within its component 11a by movement in a direction perpendicular to the rear wall thereof until the row of stab connectors 29 make interconnection with the row of socket connectors 30. The unit is then fastened against the rear panel of cabinet 11 by bolts 55. Alternatively, bolts 55 may be replaced by hooks or other plug-in fasteners thereby to permit the entire unit to be mounted in plug-in fashion.

While I have disclosed above a particular embodiment of the invention, many modifications may be made, and I intend by appended claims to cover all such modifications as fall within the true spirit and scope of the invention.

What I claim as new and desire to secure by Letters Patent in the United States is:

1. A split terminal block assembly comprising a pair of separable elongated longitudinally channeled supporting members extending alongside each other, a plurality of insulating blocks slidably received in each of said channeled members, said channeled members each including a plurality of readily deformable portions normally disposed to permit sliding movement of said blocks but deformable to prevent such sliding movement whereby to lock said blocks in predetermined position in said channeled members respectively, said blocks each including a recess therein, a connector strip carried by each of said blocks and extending into said recess, a wire-fastening screw threadedly engaging each said connector strip, said wire-fastening screw being arranged to clamp a wire to said connector strip at one end thereof and also to lock said strip in said recess, the other end of each said connector strip of one of said channeled members being arranged to make readily detachable connection with the corresponding end of a transversely adjacent connector strip carried by the other of said channeled members.

2. A split terminal block assembly comprising a pair of separable elongated longitudinally channeled supporting members extending alongside each other, a plurality of insulating blocks slidably received in each of said channeled members, a wire connecting terminal mounted on each of said blocks, a connector strip carried by at least some of said blocks on one of said channeled members to form easily separable electrical interconnection between the wire connecting terminals carried by said blocks and the wire connecting terminals carried by adjacent blocks of the other of said channeled members, said channeled members each including a plurality of readily deformable portions normally disposed to permit sliding movement of said blocks but deformable to prevent such sliding movement whereby to lock said blocks in predetermined position on said channeled members.

3. A split terminal block assembly as set forth in claim 2 wherein said channeled members each comprise a generally U-shaped member of sheet metal having inturned flange portions at the extremities of said U, said readily deformable portions comprising equally spaced integral portions of said flange portions.

References Cited in the file of this patent

UNITED STATES PATENTS

| | | |
|---|---|---|
| 2,326,327 | Brewer | Aug. 10, 1943 |
| 2,377,187 | Schey | May 29, 1945 |
| 2,411,528 | Dodington | Nov. 26, 1946 |
| 2,453,826 | Adams | Nov. 16, 1948 |
| 2,583,157 | Pierce et al. | Jan. 22, 1952 |
| 2,683,506 | Immel et al. | July 13, 1954 |
| 2,740,944 | Harrison et al. | Apr. 3, 1956 |

FOREIGN PATENTS

| | | |
|---|---|---|
| 587,304 | Great Britain | Apr. 21, 1947 |